Jan. 28, 1941.   J. BYSTRICKY   2,229,915
LUBRICANT METERING APPARATUS
Filed June 25, 1936   2 Sheets-Sheet 1

Inventor:
Joseph Bystricky
By Williams, Bradbury, McCaleb & Hinkle
Attys.

Jan. 28, 1941.     J. BYSTRICKY     2,229,915
LUBRICANT METERING APPARATUS
Filed June 25, 1936     2 Sheets-Sheet 2
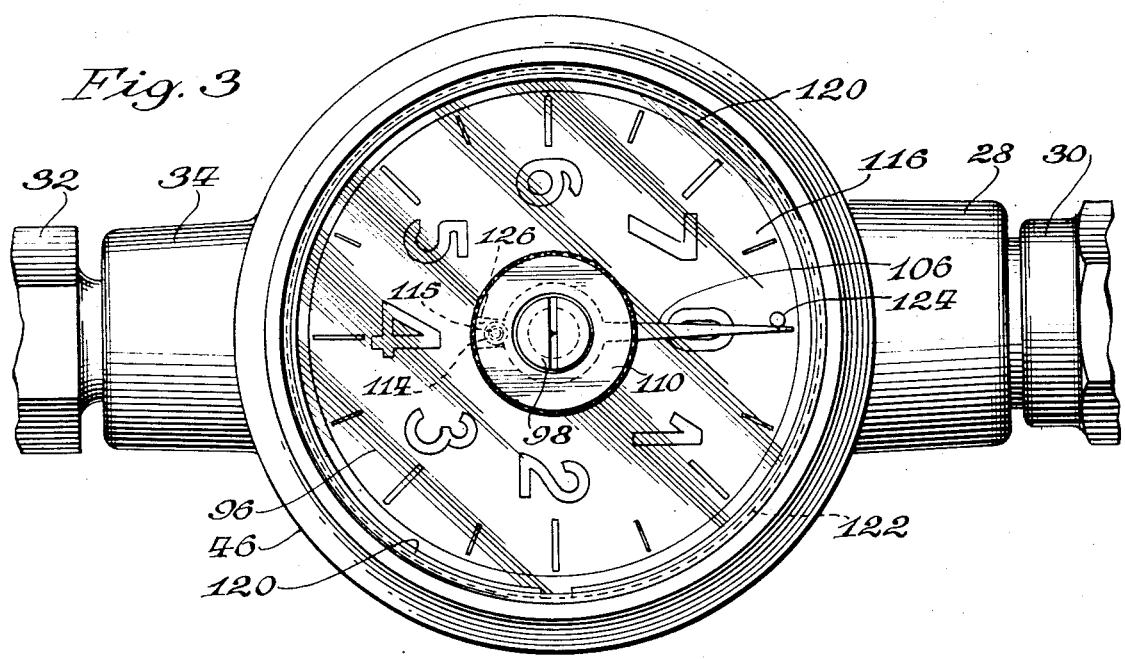
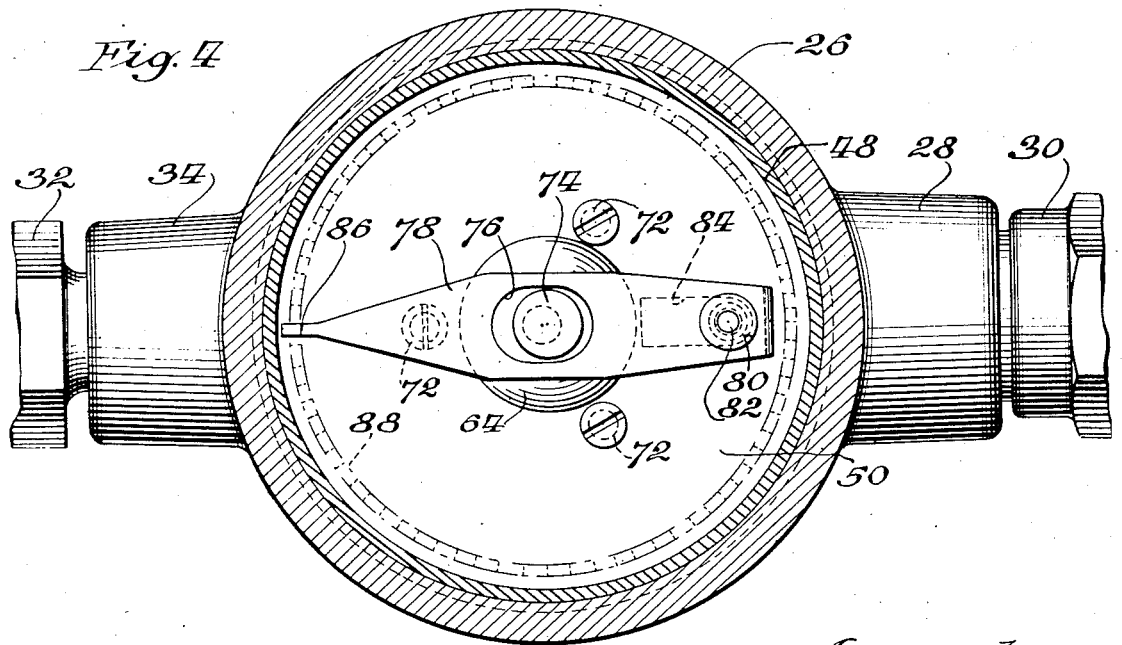
Inventor:
Joseph Bystricky
By Williams, Bradbury, McCaleb & Hinkle.
Attys.

Patented Jan. 28, 1941

2,229,915

UNITED STATES PATENT OFFICE 2,229,915

LUBRICANT METERING APPARATUS

Joseph Bystricky, Chicago, Ill., assignor to Stewart-Warner Corporation, Chicago, Ill., a corporation of Virginia Application June 25, 1936, Serial No. 87,177

4 Claims. (Cl. 73—258)

My invention relates generally to lubricant dispensing apparatus, particularly of the type used in automobile service stations for supplying measured quantities of lubricant to the differential and transmission casings. My invention also contemplates the provision of an improved lubricant meter which is sufficiently light in weight and compact that it may be secured adjacent the free end of the discharge hose of a lubricant dispensing apparatus.

Due to the relatively large size of fluid meters of sufficient capacity to be used with lubricant dispensing apparatus, such meters have been customarily positioned upon the lubricant reservoir or tank. In filling a differential housing or the like of an automobile, the service station attendant must apply the discharge nozzle to the filling opening of the casing and operate the control valve. While doing this, he is unable to observe the dial of the meter, and it is thus very difficult for him to supply a predetermined quantity of lubricant to the casing unless another attendant is available to observe the meter and advise when the desired quantity of lubricant has been dispensed. To obviate this difficulty, I have devised an improved form of fluid meter which is sufficiently rugged, compact, and light in weight to enable it to be attached at the free end of the discharge hose, in which position the attendant can readily observe the meter while holding the nozzle at the end of the discharge hose in the filling opening of the casing being supplied with lubricant, thereby greatly facilitating the operation of supplying a predetermined quantity of lubricant to such casing.

It is thus an object of my invention to provide an improved fluid meter which is very compact in construction, has few operating parts, is rugged, and is very light in weight.

Other objects will appear from the following description, reference being had to the accompanying drawings, in which:

Fig. 3 is a plan view of the meter; and

Fig. 4 is a horizontal sectional view taken on the line 4—4 of Fig. 2.

Figure 1:
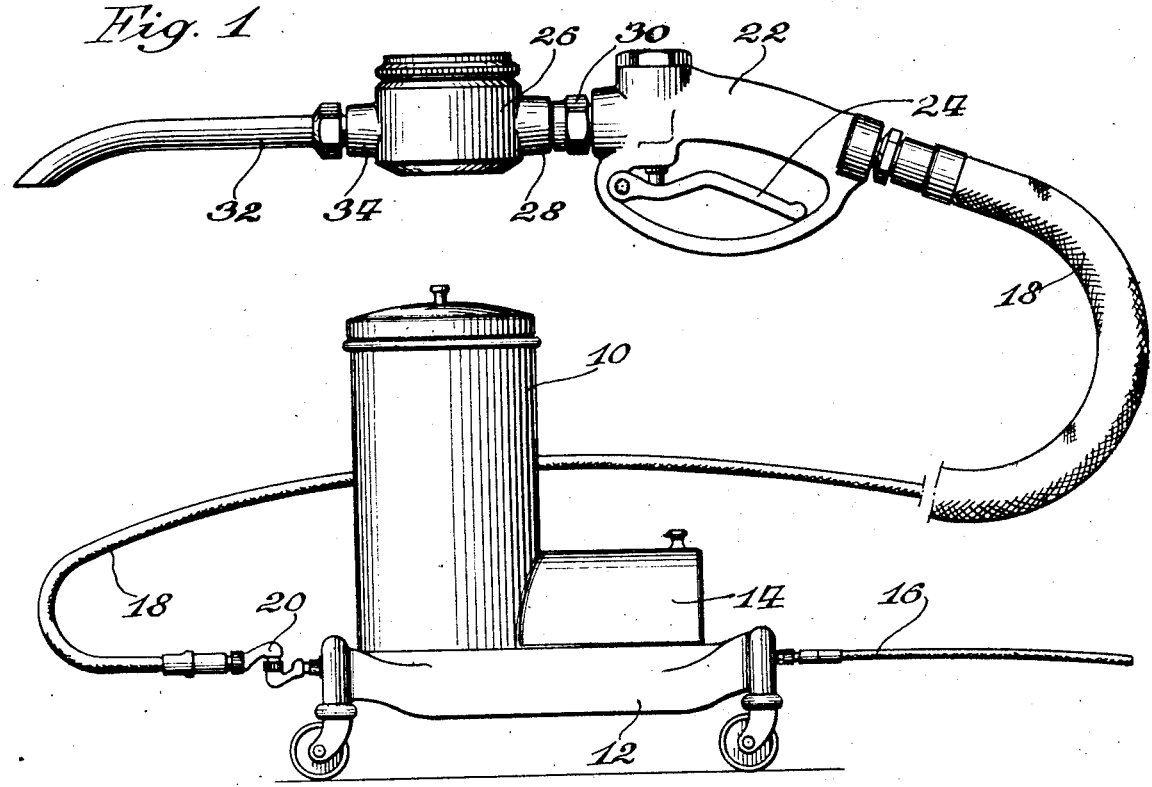
Fig. 1 is an elevation of a lubricant dispensing apparatus, a portion of the discharge hose control valve, and meter being shown to an enlarged scale.
Figure 2:
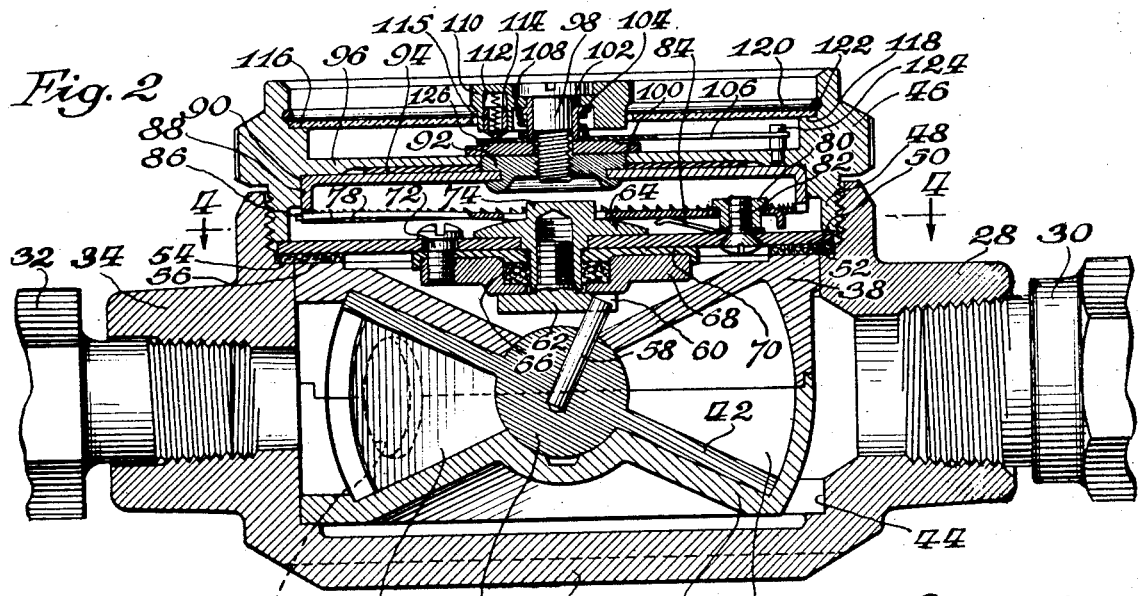
Fig. 2 is an enlarged central vertical sectional view of the meter.

The lubricant compressor illustrated in Fig. 1 is intended to be representative of any suitable means for placing lubricant under pressure, and comprises a lubricant reservoir 10 mounted upon a suitable truck 12. The compressor shown is operated by an air motor contained within a housing 14 which is supplied with compressed air through a hose 16. The lubricant is pumped from the reservoir 10 through a discharge hose 18 which is connected to the compressor by a universal swivel 20. A control valve 22 is secured to the free end of the hose 18 and is provided with an operating handle 24. The lubricant meter comprises a housing 26 having an inlet boss 28 connected to the control valve 22 by a bushing 30. A discharge nozzle 32 is threaded in an outlet boss 34 formed integrally with the casing 26.

The meter is of the nutating disc type and comprises a disc chamber 27 of customary shape formed by a pair of suitable castings 36, 38 which together form a swivel bearing for the ball portion 40 of the nutating disc 42. A partition wall 43, which, if desired, may be cast integrally with one of the castings 36, 38, extends across the chamber 27 and through a suitable slot formed in the disc 42. The lubricant enters the chamber 27 through a port 39 formed in the castings 36, 38. The castings 36, 38 are secured in a suitable bore 44 formed in the housing 26 by a dial carrying member 46 which is threaded in the casing 26. The innermost end of the threaded portion 48 of the member 46 engages a mounting plate 50 which presses against a suitable gasket 52, a portion of which rests upon a shoulder 54 formed in the casing and the remaining portion of which is held against an annular flat surface 56 formed on the top of the casting 38, thereby to prevent leakage of lubricant from the bore 44 of the housing 26.

An actuating pin 58 is driven into the ball portion 40 of the disc 42 and projects upwardly through a suitable central aperture formed in the upper casting 38. The projecting end of the pin 58 engages in a notch 60 formed in the head of a cap screw 62 which is threaded in a pawl actuator 64. The pawl actuator is mounted for rotation in the plate 50 and is sealed by a packing 66 held between a packing gland 68 and an auxiliary bearing member 70. The packing gland 68 and bearing member 70 are secured to the mounting plate 50 by a plurality of cap screws 72. The pawl actuator 64 has an eccentric head 74 which projects through an elongated aperture 76 formed in a pawl 78. The pawl is mounted for pivotal movement upon a bearing nut 80 which is secured to the mounting plate 50 by a screw 82. A leaf spring 84 is clamped between the nut 80 and the plate 50 and has its free end engaging the lower surface of the pawl 78. The spring 84 thus holds the toe 86 formed at the end of the pawl 78 in engagement with the teeth of a crown ratchet wheel 88 which is mounted for rotation in a bore 90 formed in the dial member 46. The ratchet wheel 88 has a hub 92 suitably peened thereto.

A friction disc 94 is positioned between the upper surface of the ratchet wheel 88 and a web 96, which latter forms part of the dial member 46, the web being suitably undercut to receive the friction disc. A cap screw 98, threaded in the hub 92, presses a bearing plate 100 against the upper surface of the web 96, thereby drawing the central portion of the ratchet wheel 88 upwardly and causing the latter to exert a slight pressure against the friction disc 94. The clamping pressure of the cap screw 98 is transmitted through a sleeve 102 having a flange 104.

A pointer 106 is mounted for free rotation on the sleeve 102 but is pressed against the bearing plate 100 by a compression coil spring 108, the upper end of which bears against the flange 104. The spring 108 is under sufficient compression so that the pointer 106 will normally rotate with the ratchet wheel 88. A pointer resetting nut 110 is mounted for rotation between the flange 104 and the head of cap screw 98 and has a socket 112 formed therein for receiving a detent plunger 114 which has a pointed end and is pressed downwardly by a compression coil spring 115.

The indicia on the dial, as shown in Fig. 3, are formed upon the upper surface of the web 96 and are visible through a sheet of glass 116 which is secured against a shoulder 118 formed in the dial member 46, by means of a split ring spring 120 which is lodged in a groove 122. A pointer stop pin 124 is pressed into the web 96 so as to arrest the pointer at zero position. As will be noted from Fig. 3, the pointer 106 has a tail portion 126 which may be engaged by the detent plunger 114 in restoring the pointer to zero position.

In operation, the service station attendant may apply the nozzle 32 to the casing to be filled with lubricant, and, by operating the control valve 22 by means of the lever 24, regulate the quantity of lubricant supplied to the casing. While doing this, he may watch the indication of the pointer 106 of the meter to supply a predetermined amount of lubricant to the casing, but at the same time the attendant may observe the flow of lubricant into the casing to see that it is not filled above the desired level.

Whenever the valve 22 is open, lubricant will be forced under pressure from the lubricant compressor through the hose 18 and valve 22 into the bore 44 of the meter housing 26, from whence it will flow through aperture 39 into and through the chamber 27 formed between the castings 36 and 38, and hence to the outlet opening to be discharged through the nozzle 32. During its flow through the chamber 27, a nutatory motion will be imparted to the disc in the well known manner, and the outer end of the pin 58 will thus move in a circular path, thereby rotating the pawl actuator 64. The eccentric 74 of this actuator will thus oscillate the pawl 78 about its pivot bearing 82. The pitch of the teeth on the ratchet wheel 88 is such that upon each oscillation of the pawl 78 its tooth 86 will advance the ratchet wheel one tooth. Movement of the ratchet wheel in a reverse direction is prevented because of its frictional mounting due to its engagement with the friction disc 94. During the rotation of the ratchet wheel 88, the pointer 106 will be carried therewith and indicate the amount of lubricant dispensed.

When it is desired to reset the pointer to zero position, the attendant will rotate the knurled resetting member 110 counterclockwise (Fig. 3) so as to bring the pointer into engagement with the stop pin 124. The plunger 114 may engage either the tail portion 126 or the hand portion of the pointer 106. The plunger 114 being spring pressed, and having a conical tip for engagement with the pointer, is capable of riding over the pointer when the latter strikes the stop pin 124, thus preventing damage to the pointer. The ratchet wheel 88 and the method of driving it constitute a very simple and effective speed reduction mechanism which is much more rugged and compact than the train of spur gears customarily employed for this purpose.

The castings 36, 38 as well as the housing 26 and dial member 46 are preferably die castings so as to be very light in weight. Due to the use of the eccentric-pawl-ratchet mechanism for moving the pointer, the meter as a whole is rendered very compact so that it is of the same order of size as the control valve and is in effect an appurtenance to the latter. The arrangement of the parts is such that the meter may be very easily and quickly assembled. By unscrewing the dial member 46, substantially all of the working parts are available for inspection or replacement.

While I have shown and described a preferred embodiment of my invention, it will be readily understood by those skilled in the art that variations may be made in the construction disclosed without departing from the basic features of my invention. I therefore do not wish to be limited to the precise construction disclosed, but wish to include within the scope of my invention all such modifications and variations which will readily suggest themselves to those skilled in the art.

What I claim as new and desire to secure by United States Letters Patent is:

1. A volume meter for dispensers of lubricants and the like comprising, a housing having a closed end bore therein, a nutatory disc and means forming a chamber therefor positioned in said bore, a gasket for sealing said means in said housing, a plate engaging said gasket, a dial carrying member threaded in said housing and pressing said plate against said gasket, an actuating element carried by said nutatory disc, an eccentric rotatably mounted in said plate, a pawl pivotally secured to said plate and having an aperture embracing said eccentric, a ratchet wheel rotated by said pawl, and a pointer operated by said ratchet wheel and operating over said dial.

2. In a flow meter having a nutatory disc, a housing having a chamber for said disc, an actuating element secured to said disc, the combination of an eccentric mounted within said housing for rotation by said element, a pawl oscillated by said eccentric, a rotatable ratchet wheel engageable by said pawl, a pointer frictionally connected to said ratchet wheel, and a resetting knob having a yieldable part frictionally engaging and rotatable with said pointer.

3. A flow meter for lubricant dispensers and the like comprising, a housing having inlet and outlet ports and a bore formed therein, a nutatory disc, a casing therefor within the bore of said housing, a plate closing one end of said bore and holding said casing therein, an eccentric carrying element rotatably mounted on said plate, a driving connection for causing nutatory motion of said disc to rotate said element, a pawl pivotally mounted on said plate and having portions thereof embracing the eccentric of said element, a dial member threaded in said casing and clamping said plate against said casing, a ratchet wheel rotatably secured to said member and engageable by said pawl for rotation thereby, means to prevent retrograde movement of said ratchet wheel, an indicator frictionally connected to said ratchet wheel, and manually operable means to reset said indicator.

4. In a flow meter having a flow responsive means, an eccentric driven by said flow responsive means, a pawl oscillated by said eccentric, a rotatable ratchet wheel engageable by said pawl, a pointer driven by said ratchet wheel in one direction and having an abutment providing a shoulder facing in said direction of rotation, a resetting knob carrying a plunger, spring means pressing said plunger to engage said abutment in driving relation for moving said pointer when said knob is turned the opposite direction, stop means limiting movement of said pointer in the said opposite direction, said plunger being tapered at its abutment engaging end to yield against said spring means to release said engagement with said abutment when said pointer engages said stop means.

JOSEPH BYSTRICKY.